(12) United States Patent
Heo et al.

(10) Patent No.: US 10,309,699 B2
(45) Date of Patent: Jun. 4, 2019

(54) ELECTRIC COMPRESSOR AND METHOD FOR CONTROLLING SAME

(71) Applicant: Hanon Systems, Daejeon (KR)

(72) Inventors: Jeong Gil Heo, Daejeon (KR); Soo Cheol Jeong, Daejeon (KR); Gun Woong Park, Daejeon (KR); Chan Ho Baek, Daejeon (KR); Jae Sik Son, Daejeon (KR)

(73) Assignee: HANON SYSTEMS (KR)

( * ) Notice: Subject to any disclaimer, the term of this patent is extended or adjusted under 35 U.S.C. 154(b) by 356 days.

(21) Appl. No.: 14/910,282

(22) PCT Filed: Apr. 10, 2015

(86) PCT No.: PCT/KR2015/003639
§ 371 (c)(1),
(2) Date: Feb. 5, 2016

(87) PCT Pub. No.: WO2015/156647
PCT Pub. Date: Oct. 15, 2015

(65) Prior Publication Data
US 2016/0370038 A1 Dec. 22, 2016

(30) Foreign Application Priority Data

Apr. 11, 2014 (KR) .................. 10-2014-0043752
Apr. 10, 2015 (KR) .................. 10-2015-0050908

(51) Int. Cl.
*F25B 31/02* (2006.01)
*B60H 1/32* (2006.01)
(Continued)

(52) U.S. Cl.
CPC ......... *F25B 31/02* (2013.01); *B60H 1/00985* (2013.01); *B60H 1/3205* (2013.01);
(Continued)

(58) Field of Classification Search
CPC .............. F04C 2240/81; F04C 2270/18; F04C 2270/19; H02P 29/40; F25B 31/02;
(Continued)

(56) References Cited

U.S. PATENT DOCUMENTS

| | | | | |
|---|---|---|---|---|
| 5,996,358 A | * | 12/1999 | Sumida | ................. C09K 5/045 62/114 |
| 2009/0125257 A1 | * | 5/2009 | Jayanth | ................. F04B 35/04 702/64 |
| 2013/0300232 A1 | * | 11/2013 | Jung | ................. H02K 15/0087 310/71 |

FOREIGN PATENT DOCUMENTS

| CN | 103154638 A | 6/2013 |
|---|---|---|
| CN | 203223382 U | 10/2013 |

(Continued)

OTHER PUBLICATIONS

English Translation of JP 09-113039 obtained May 2, 2018.*

*Primary Examiner* — Dominick L Plakkoottam
*Assistant Examiner* — Connor J Tremarche
(74) *Attorney, Agent, or Firm* — Shumaker, Loop & Kendrick, LLP; James D. Miller

(57) ABSTRACT

An electric compressor and a method of controlling the same, the electric compressor including a detection unit for detecting a phase of refrigerant in the electric compressor, a connection unit wound at a position adjacent to a passage of a housing for movement of a refrigerant in the electric compressor, and a control unit for performing control according to the phase of refrigerant by differently controlling power applied to the connection unit in response to data detected by the detection unit. The method including aligning a position of a rotor after an electric compressor is turned on, determining whether a refrigerant is in liquid phase or in gas phase, preheating the refrigerant by applying power to the electric compressor according to the phase of refrigerant, (Continued)

and controlling the electric compressor such that the electric compressor is normally operated after the refrigerant is preheated.

7 Claims, 9 Drawing Sheets

(51) Int. Cl.
H02P 29/40 (2016.01)
B60H 1/00 (2006.01)
F04C 28/28 (2006.01)
F04C 29/04 (2006.01)
F04C 23/00 (2006.01)
H02K 3/12 (2006.01)
H02K 3/46 (2006.01)
H02K 3/28 (2006.01)
F04C 18/02 (2006.01)

(52) U.S. Cl.
CPC .......... *F04C 23/008* (2013.01); *F04C 28/28* (2013.01); *F04C 29/04* (2013.01); *H02P 29/40* (2016.02); *B60H 2001/325* (2013.01); *B60H 2001/327* (2013.01); *B60H 2001/3257* (2013.01); *F04C 18/0215* (2013.01); *F04C 2240/81* (2013.01); *F04C 2270/18* (2013.01); *F04C 2270/19* (2013.01); *H02K 3/12* (2013.01); *H02K 3/28* (2013.01); *H02K 3/46* (2013.01)

(58) Field of Classification Search
CPC ............ B60H 1/3205; B60H 2001/325; B60H 2001/3257; B60H 2001/327; H02K 3/12; H02K 3/28; H02K 3/46
USPC .......................................................... 417/32
See application file for complete search history.

(56) References Cited

FOREIGN PATENT DOCUMENTS

| JP | H0875274 A | | 3/1996 |
| JP | H09113039 | * | 5/1997 |
| JP | H09113039 A | | 5/1997 |
| JP | 2001065478 A | | 3/2001 |
| JP | 2007182572 A | | 6/2007 |
| KR | 20100129491 A | | 12/2010 |

* cited by examiner

ELECTRIC COMPRESSOR AND METHOD FOR CONTROLLING SAME

CROSS-REFERENCE TO RELATED APPLICATIONS

This patent application is a United States national phase patent application based on PCT/KR2015/003639 filed Apr. 10, 2015 which claims the benefit of Korean Patent Application No. 10-2014-0043752 filed Apr. 11, 2014 and Korean Patent Application No. 10-2015-0050908 filed Apr. 10, 2015. The entire disclosures of the above patent applications are hereby incorporated herein by reference.

FIELD OF THE INVENTION

Exemplary embodiments of the present invention relate to an electric compressor and a method of controlling the same, and more particularly, to an electric compressor configured such that a gas-phase refrigerant, which is present therein, is maintained at it is through heating thereof even when the gas-phase refrigerant is partially changed to a liquid-phase refrigerant, and a method of controlling the same.

BACKGROUND OF THE INVENTION

In general, a variety of compressors have been developed in order to be used for the compression of refrigerants in vehicle cooling systems. These compressors are classified into reciprocating compressors which perform compression during reciprocating and rotary compressors which perform compression during rotating, according to methods of compressing refrigerants.

When the temperature of outdoor air is low as in the change of seasons or the winter season, a refrigerant has a temperature equal to or less than the boiling point, and is thus changed from gas phase to liquid phase. A compressor may functionally compress a gas-phase refrigerant but may not compress a liquid-phase refrigerant. For this reason, when a liquid-phase refrigerant is introduced into a compression system, fatigue may be gradually accumulated in the compression system due to the resistance of fluid.

When the compressor of an air conditioning system begins to compress a liquid, a refrigerant is changed from liquid phase to gas phase while the pressure and enthalpy of the refrigerant are increased, and a time required for this phase change has a large effect on the durability of the compressor. In addition, the liquid refrigerant adversely affects lubrication since it basically washes oil in the compressor. Furthermore, since oil separation is not properly performed if the refrigerant is insufficiently evaporated at the discharge end of the compressor, an oil separation system may not be normally operated.

For the durability of the compressor of the conventional air conditioning system, it is tested whether or not the drive unit of the compressor satisfies durability standards by testing the operation of liquid compression for several thousands of cycles. Accordingly, since the drive unit must be necessarily designed to have stiffness in order to satisfy this durability, the method of preventing the operation of liquid compression in the compressor is urgently required.

SUMMARY OF THE INVENTION

An object of the present invention is to provide an electric compressor capable of detecting when a refrigerant is changed from gas phase to liquid phase in the electric compressor using the refrigerant as working fluid so that the refrigerant is maintained as it is in the gas phase, and a method of controlling the same.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, an electric compressor includes a detection unit for detecting a phase of refrigerant in the electric compressor, a connection unit wound at a position adjacent to a passage of a housing for movement of a refrigerant in the electric compressor, and a control unit for performing control according to the phase of refrigerant by differently controlling power applied to the connection unit in response to data detected by the detection unit.

The detection unit may include a temperature sensor for detecting a temperature in the electric compressor.

The detection unit may include a pressure sensor for detecting a pressure in the electric compressor.

The connection unit may be a three-phase coil wound around a stator located in the electric compressor, and may include a first connection wound many times on the outermost side of the stator located in the electric compressor, a second connection wound many times radially inward from the wound first connection, and a third connection wound many times radially inward from the wound second connection.

The control unit may provide current state information of the electric compressor according to the data detected by the detection unit for a driver through a display unit arranged on an instrument panel.

The control unit may include a calculation unit calculating enthalpy data according to the data detected by the detection unit.

In accordance with another aspect of the present invention, an electric compressor includes a detection unit for detecting a phase of refrigerant in the electric compressor, a connection unit wound adjacent to a passage of a housing for movement of a refrigerant in the electric compressor, a control unit for controlling power applied to the connection unit in response to data detected by the detection unit, and a communication module transmitting a control signal from the control unit to a terminal of an operator for providing current state information of the electric compressor.

The control unit may include a memory unit storing the data detected by the detection unit if the detected data is not transmitted to the operator through the communication module, and when the operator gets into a vehicle, information about the detected data stored in the memory unit may be provided for the operator through a display unit arranged on an instrument panel.

The detection unit may include a temperature sensor for detecting a temperature in the electric compressor, and a pressure sensor for detecting a pressure in the electric compressor.

The compressor may be one of vehicle and industrial compressors each using a refrigerant as working fluid.

In accordance with another aspect of the present invention, a method of controlling an electric compressor includes aligning a position of a rotor (ST10) after an electric compressor is turned on, determining whether a refrigerant is in liquid phase or in gas phase (ST20) after the position of the rotor is aligned, preheating the refrigerant (ST30) by applying power to the electric compressor according to the phase of refrigerant, and controlling the electric compressor (ST40) such that the electric compressor is normally operated after the refrigerant is preheated.

The aligning a position of a rotor (ST10) may include setting positions of operation of the rotor and a stator of the electric compressor by applying DC power to the electric compressor for t seconds (ST12).

The determining whether a refrigerant is in liquid phase or in gas phase (ST20) may include detecting a temperature in the electric compressor (ST22), and detecting a pressure in the electric compressor (ST24).

The determining whether a refrigerant is in liquid phase or in gas phase (ST20) may further include determining enthalpy data, based on the temperature and pressure in the electric compressor (ST26).

The preheating the refrigerant (ST30) may include performing first preheating (ST32) for differently controlling an intensity and application time of DC power applied to the electric compressor.

The preheating the refrigerant (ST30) may further include performing second preheating (ST34) for uniformly controlling the intensity and application time of the DC power applied to the electric compressor after the performing first preheating.

The preheating the refrigerant (ST30) may include redetermining whether the refrigerant is currently present in liquid phase or in gas phase (ST36) while the refrigerant is preheated.

In accordance with another aspect of the present invention, a method of controlling an electric compressor includes aligning a position of a rotor (ST100) after an electric compressor is turned on, determining whether a refrigerant is in liquid phase or in gas phase (ST200) after the position of the rotor is aligned, providing current state information of the electric compressor for an operator (ST300) according to the phase of refrigerant in the electric compressor, preheating the refrigerant (ST400) by applying power to the electric compressor according to whether or not a control command of an operator is present, and controlling the electric compressor (ST500) such that the electric compressor is normally operated after the refrigerant is preheated.

The providing current state information of the electric compressor for an operator (ST300) may include communicating with a server through a communication module provided in a mounting objet equipped with the electric compressor (ST310), and displaying state information of the refrigerant in the electric compressor on a terminal of the operator (ST320).

The preheating the refrigerant (ST400) may include immediately preheating the refrigerant (ST410) by applying DC power to the electric compressor when a control command is received from the operator, and additionally providing the state information of the electric compressor for the operator (ST420) while repeatedly warning the operator of the state information for N times when the operator does not transmit the control command thereto.

The preheating the refrigerant (ST400) may further include automatically controlling the electric compressor by predetermined power (ST430) when the control command is not received from the operator even after the additionally providing the state information of the electric compressor for the operator (ST420).

In accordance with a further aspect of the present invention, a method of controlling an electric compressor includes determining whether a refrigerant in an electric compressor is in liquid phase or in gas phase (ST1000) in a state in which a vehicle is stopped, preheating the refrigerant (ST2000) by applying power to the electric compressor according to the phase of refrigerant, regardless of starting of the vehicle, and transmitting current state information of the electric compressor to an operator (ST3000) after the refrigerant is preheated.

The determining whether a refrigerant in an electric compressor is in liquid phase or in gas phase (ST1000) may include periodically determining the phase of refrigerant in the electric compressor (ST1100).

The preheating the refrigerant (ST2000) may include uniformly applying an intensity and application time of DC power applied to the electric compressor for t1 time (ST2100), and controlling the electric compressor (ST2200) such that the power applied to the electric compressor is turned off after the power is applied to the electric compressor for t1 time.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF EMBODIMENTS

Figure 1:
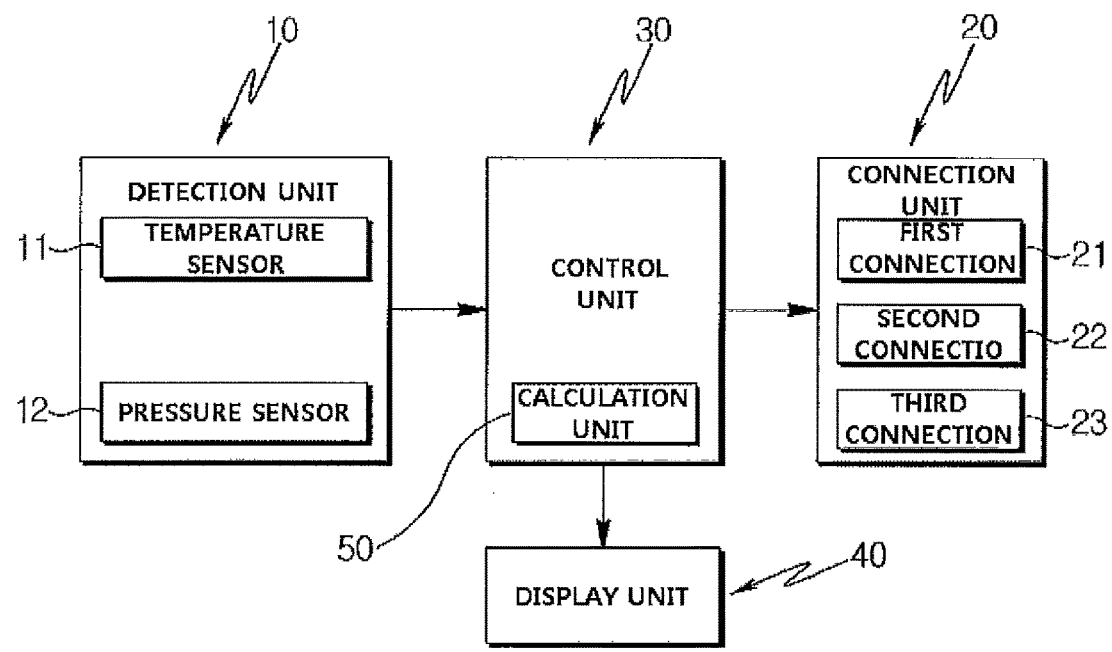
FIG. 1 is a block diagram illustrating the configuration of an electric compressor according to a first embodiment of the present invention.
Figure 2:
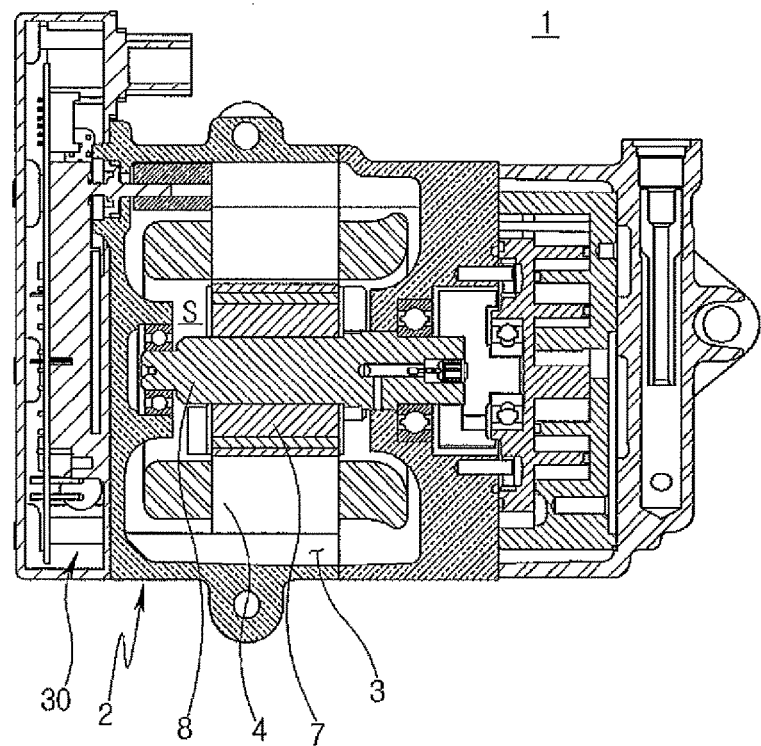
FIG. 2 is a cross-sectional view illustrating the electric compressor according to the first embodiment of the present invention.
Figure 3:
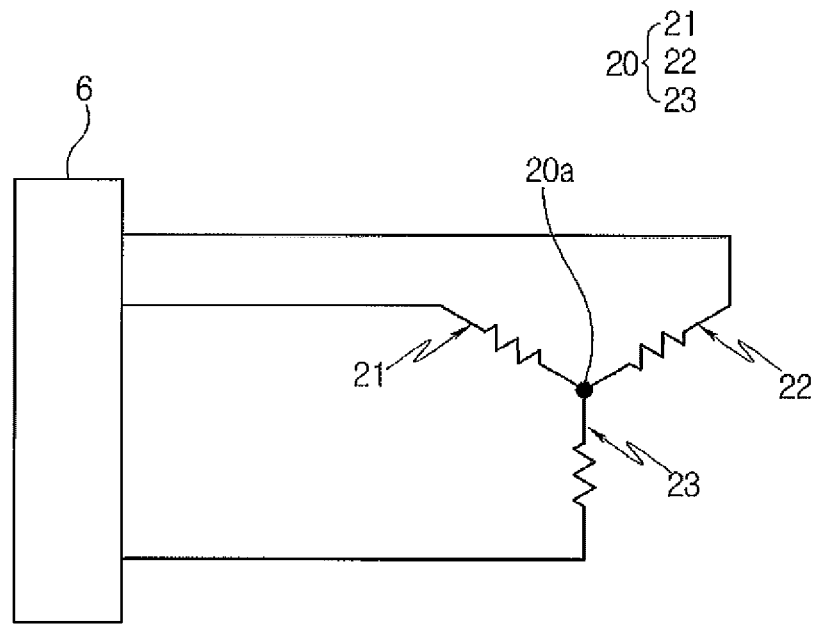
FIG. 3 is a view illustrating the configuration of an inverter and a connection unit according to the first embodiment of the present invention.
Figure 4:
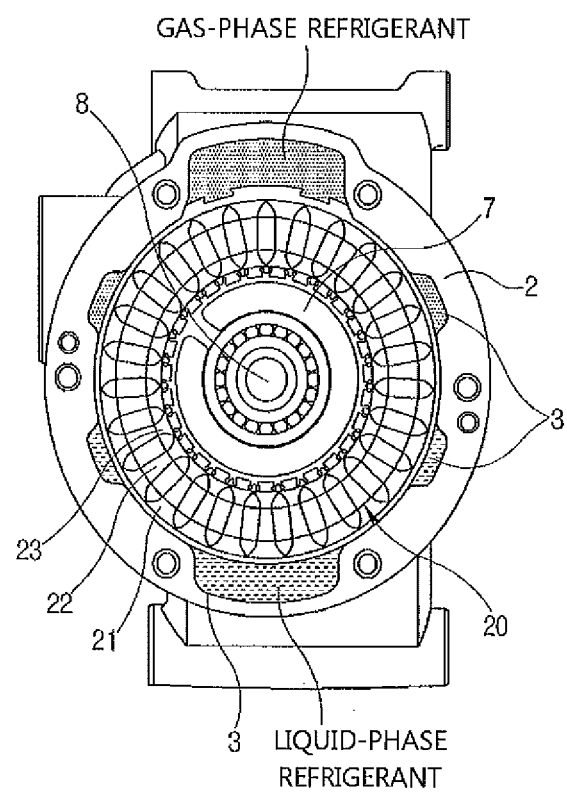
FIG. 4 is a cross-sectional view illustrating the arrangement of the connection unit and a passage of the electric compressor according to the first embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. First, a first embodiment of the present invention will be described in detail with reference to the accompanying drawings. For reference, FIG. 1 is a block diagram illustrating the configuration of an electric compressor according to a first embodiment of the present invention, FIG. 2 is a cross-sectional view illustrating the electric compressor according to the first embodiment of the present invention, FIG. 3 is a view illustrating the configuration of an inverter and a connection unit according to the first embodiment of the present invention, and FIG. 4 is a cross-sectional view illustrating the arrangement of the connection unit and a passage of the electric compressor according to the first embodiment of the present invention.

Referring to FIGS. 1 to 4, the electric compressor, which is designated by reference numeral 1, according to the first embodiment will be described as a compressor mounted to a vehicle for use in an air conditioning unit, but may be one of a variety of compressors, such as a compressor using a refrigerant as working fluid in other industry fields or an electric compressor exposed to low-temperature operation conditions.

To this end, the electric compressor 1 according to the present embodiment includes a detection unit 10 which detects a phase of refrigerant in the electric compressor 1, a connection unit 20 which is wound adjacent to a passage 3 of a housing 2 for movement of a refrigerant in the electric compressor, and a control unit 30 which performs control according to the phase of refrigerant by differently controlling power applied to the connection unit 20 in response to data detected by the detection unit 10.

The detection unit 10 includes a temperature sensor 11. The temperature sensor 11 may be mounted outside the electric compressor for detecting a temperature of the electric compressor or detecting a temperature around the electric compressor, may be located at the specific position of an engine room for detecting a temperature in the engine room equipped with the electric compressor, may be installed around a radiator, may be installed within a vehicle for measuring a temperature in the vehicle, or may be located outside a mounting object equipped with the electric compressor for detecting a temperature of outdoor air.

Although the temperature sensor is usable for all cases in the present invention, the temperature sensor will be described as detecting the temperature in the electric compressor in the first embodiment. However, the temperature sensor 11 may be configured to detect the temperature of outdoor air and transmit control signals to the control unit 30, and may be configured to detect the temperature around the electric compressor and transmit control signals to the control unit 30.

The detection unit 10 includes the above-mentioned temperature sensor 11 and a pressure sensor 12. The pressure sensor 12 will be described as being installed within the electric compressor for detecting the pressure in the electric compressor, but the present invention is not necessarily limited thereto. For example, the pressure sensor 12 may be installed at another position to detect the pressure of the electric compressor.

The control unit 30 may determine the phase of refrigerant using data detected by both of the temperature sensor 11 and the pressure sensor 12, or may determine the current phase of refrigerant in the electric compressor using only data detected by the temperature sensor 11. Accordingly, the control unit 30 is not necessarily limited to determining the phase of refrigerant using data detected by both of the temperature sensor 11 and the pressure sensor 12.

The temperature sensor 11 and the pressure sensor 12 may be mounted, for example, to an inverter 6 so as to detect the changes of temperature and pressure in the electric compressor and transmit the detected data to the control unit 30. As described above, the current phase of refrigerant in the electric compressor may be determined by detecting the temperature of outdoor air using the temperature sensor without using the pressure sensor 12.

The electric compressor 1 uses a refrigerant as working fluid therein, and the refrigerant may be changed to a liquid-phase refrigerant at below-freezing temperatures. The temperature sensor 11 detects the current temperature of the refrigerant, and the pressure sensor 12 detects the current pressure of the refrigerant.

Temperature data and pressure data are transmitted to the control unit 30 via the inverter 6. Particularly, the temperature sensor 11 may be mounted to the inverter which is located at a position facing a suction port S of the electric compressor, and may stably detect the temperature of the refrigerant, so that the reliability of the detected temperature data is improved.

The pressure sensor 12 detects the pressure of the refrigerant introduced through the suction port S, and it is possible to accurately determine whether the refrigerant is currently present in gas phase or in liquid phase through the temperature sensor 11 and the pressure sensor 12.

In order to determine the phase of refrigerant in the electric compressor, the enthalpy of the refrigerant is calculated based on the temperature and pressure data of the refrigerant. The control unit 30 includes a calculation unit 50 which calculates enthalpy data according to the temperature and pressure data detected by the detection unit 10. The current enthalpy of the refrigerant in the electric compressor is numerically calculated by the calculation unit 50. Thus, it is possible to accurately determine whether the refrigerant in the electric compressor is in the liquid phase or in the gas phase, based on the temperature, pressure, and enthalpy data.

Referring to FIGS. 2 and 3, the connection unit 20 is a three-phase coil wound around a stator 4 located within the electric compressor, and has a Y-connection form as a whole. The connection unit 20 includes a first connection 21, a second connection 22, and a third connection 23, which will be described later. The first connection 21 is wound many times on the outermost side of the stator 4. The second connection 22 is wound many times radially inward from the wound first connection 21. The third connection 23 is wound many times radially inward from the wound second connection 22.

The first, second, and third connections 21, 22, and 23 form a Y-connection about a neutral point 20a, and electromagnetic force is generated when actuating power is applied to the first, second, and third connections 21, 22, and 23 through the inverter 6. When the actuating power is DC power, the power is selectively applied to the first and second connections 21 and 22 corresponding to two phases in the three-phase coil, and thus the first and second connections 21 and 22 generate heat by wire-wound resistance.

The connection unit 20 is disposed at a position closest to the passage 3 for the flow of refrigerant. Since the first and second connections 21 and 22 are disposed at positions closest to the passage, the first and second connections 21 and 22 generate heat by power applied thereto when the refrigerant is present in the liquid phase, thereby enabling the liquid-phase refrigerant to be rapidly changed to a gas-phase refrigerant.

In this case, the liquid-phase refrigerant in the electric compressor 1 is changed to a gas-phase refrigerant, and the temperature sensor 11 and the pressure sensor 12 detect the temperature and pressure of the refrigerant together with the heating of the first and second connections 21 and 22, and transmit the detected data to the control unit 30.

The control unit 30 provides the current state information of the electric compressor 1 according to the data detected by the detection unit 10 for a driver through a display unit 40 arranged on an instrument panel. The display unit 40 displays the current state information of the electric compressor 1 in real time for the driver. Accordingly, it is possible to prevent malfunction of the electric compressor 1 or improve the response of the electric compressor 1. In addition, oil contained in the refrigerant may be stably separated for improving oil separation efficiency, and it is thus possible to improve the lubrication performance of many components included in the electric compressor 1.

The display unit 40 displays information about the phase of refrigerant, etc. as icons. When the refrigerant is changed from gas phase to liquid phase, the display unit 40 displays this phase change as a specific color or generates lighting for improving visibility. Thus, the driver may visually and accurately recognize the phase change and manage the electric compressor 1. For reference, reference numeral 8 designates a shaft which is not described.

The housing 2 is disposed radially with respect to the inner center of the electric compressor, and has the passage 3 formed in the longitudinal direction thereof for the flow of refrigerant. The passage 3 is disposed adjacent to at least first and second connections 21 and 22 to which actuating power is applied for initial alignment of a rotor 7, from among the first to third connections 21, 22, and 23 on the stator 4. That is, the first and second connections 21 and 22 of the first to third connections 21, 22, and 23 are disposed at positions closest to the passage 3.

Accordingly, when electromagnetic force is generated by applying actuating power to the connection unit 20, the rotor 7 is rotated by Lorentz force.

In this case, the electric compressor is aligned by applying actuating power to the connection unit 20 in order to detect the position of the rotor 7 when the electric compressor is initially driven. By such forced alignment, each actuating power is applied to only the first and second connections 21 and 22 closest to the passage 3 from among the first to third connections 21, 22, and 23. Therefore, the first and second connections 21 and 22 generate heat by wire-wound resistance and the refrigerant flowing through the passage 3 may be preheated. Thereby, the enthalpy of the refrigerant is increased and it is thus possible to more rapidly suppress liquid compression caused when the electric compressor 1 is initially operated.

Figure 5:
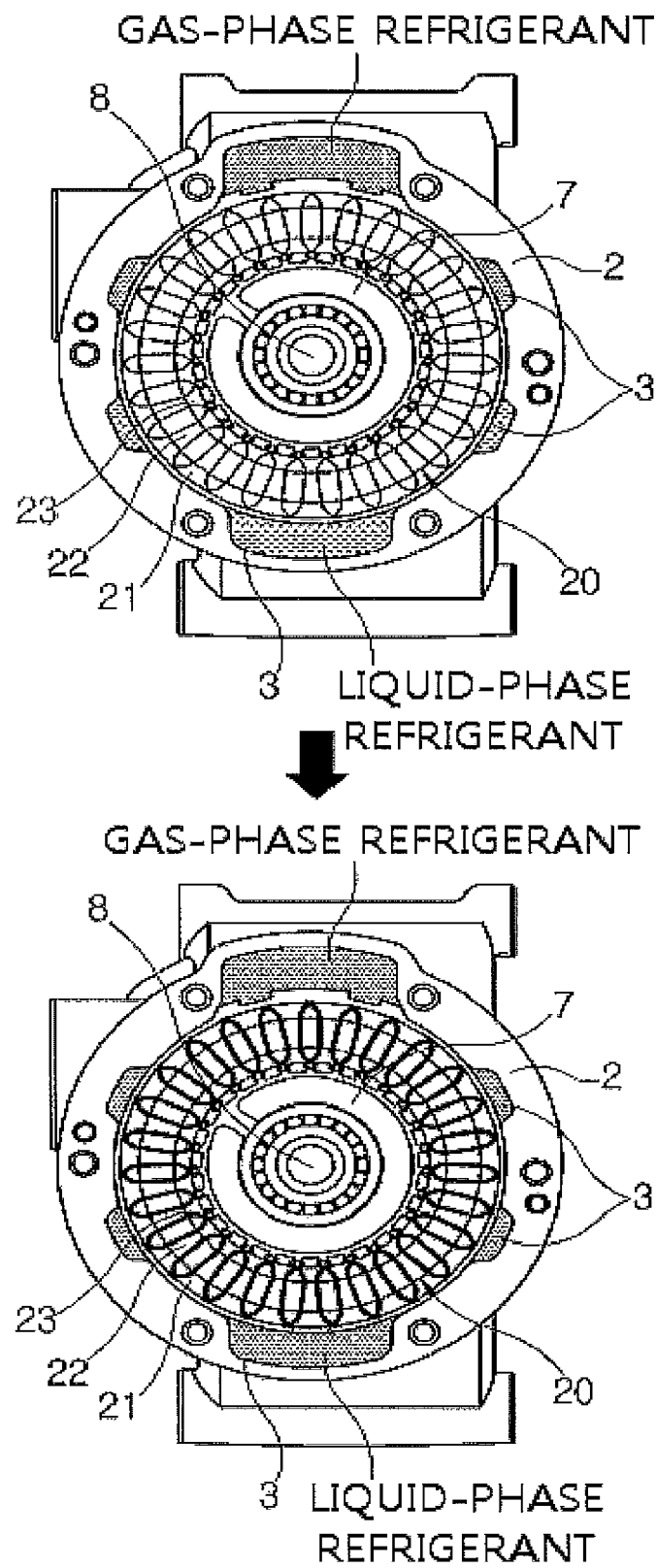
FIG. 5 is a view illustrating the state in which the phase change of refrigerant is performed when the connection unit generates heat according to the first embodiment of the present invention.

Referring to FIGS. 4 and 5, when the gas-phase refrigerant in the electric compressor 1 is exposed at below-freezing temperatures for a long time, and is partially changed to a liquid-phase refrigerant, the changed liquid-phase refrigerant is collected and maintained in the lower side of the electric compressor in the cross-sectional view thereof, and the gas-phase refrigerant remains in the upper side of the electric compressor. Therefore, when a portion of the liquid-phase refrigerant is present in the electric compressor, the liquid-phase refrigerant is changed to the gas-phase refrigerant during the heating of the connection unit 20 so that the electric compressor 1 is stably operated.

The liquid refrigerant may be formed in a clockwise direction between five o'clock and seven o'clock or between four o'clock and eight o'clock, but may be formed in a range greater or smaller than the above range. When the connection unit 20 generates heat, the liquid refrigerant is changed to a gas-phase refrigerant.

The compressor in the present embodiment may be one of vehicle or industrial compressors each using a refrigerant as working fluid, and the vehicle may be one of gasoline vehicles, diesel vehicles, fuel cell vehicles, and electric vehicles. The industrial compressor may be used in various industry fields.

Hereinafter, an electric compressor according to a second embodiment of the present invention will be described with reference to the drawings. The present embodiment differs from the first embodiment in that the state information of the electric compressor is provided for an operator in real time through a communication module.

Figure 6:
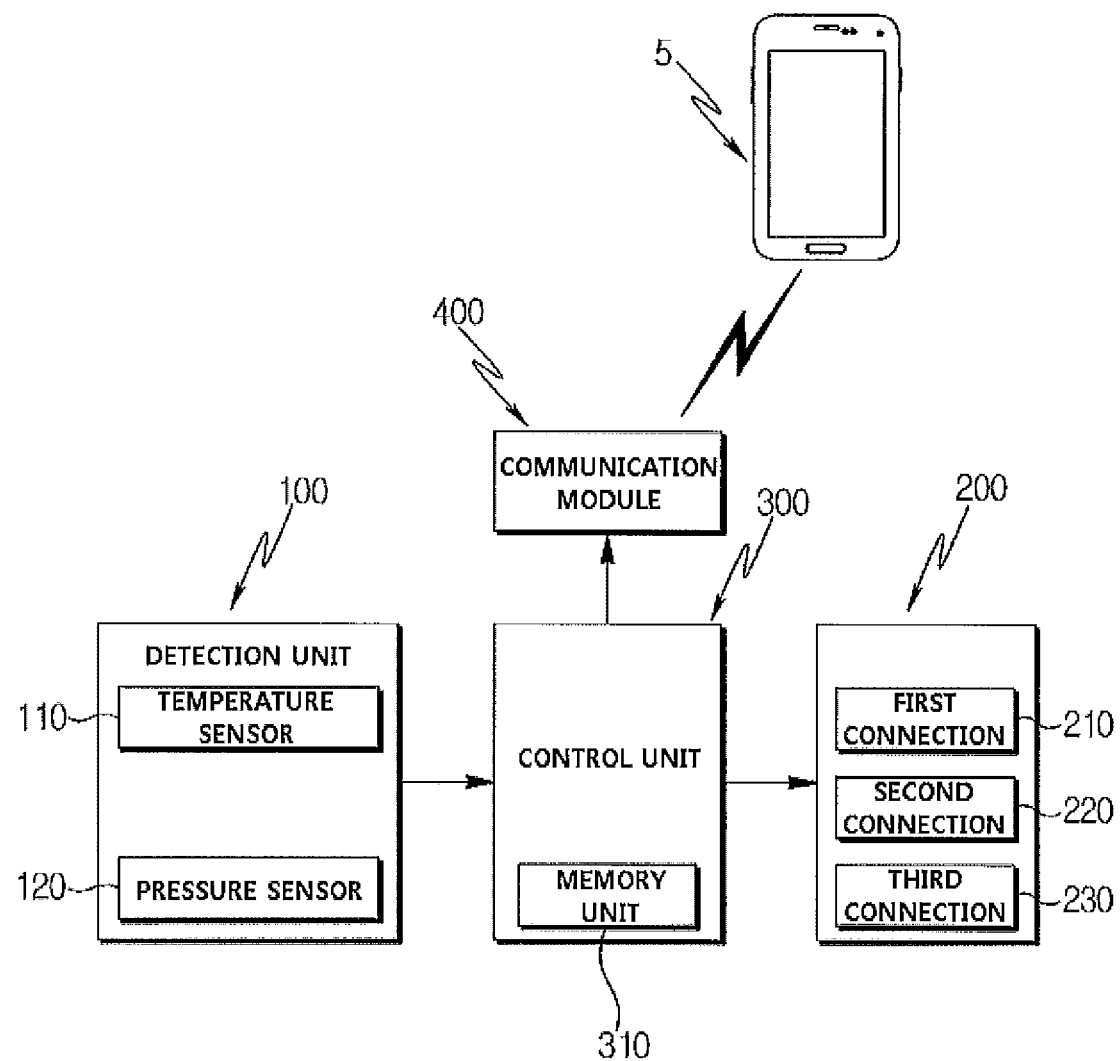
FIG. 6 is a block diagram illustrating the configuration of an electric compressor according to a second embodiment of the present invention.

Referring to FIG. 6, the electric compressor, which is designated by reference numeral 1, according to the second embodiment includes a detection unit 100 which detects a phase of refrigerant in the electric compressor 1, a connection unit 200 which is wound adjacent to a passage 3 of a housing 2 for movement of a refrigerant in the electric compressor, a control unit 300 which controls power applied to the connection unit 200 in response to data detected by the detection unit 100, and a communication module 400 which transmits control signals from the control unit 300 to a terminal 5 of an operator for providing the current state information of the electric compressor.

The communication module 400 may be mounted to the electric compressor 1 together with the control unit 300, or may be mounted to a vehicle or a mounting object (not shown) equipped with the electric compressor 1. The terminal 5 of the operator may be one of smart phones and PDAs or any device, but the present invention is not limited thereto.

When the communication module 400 is mounted to the control unit 300, the communication module 400 has a unique serial number so as not to interfere with other communication modules mounted to other electric compressors, and is independently operated. Therefore, it is possible to prevent many electric compressors from interfering with each other or from malfunctioning.

The control unit 300 includes a memory unit 310 which stores data detected by the detection unit 100 if the detected data is not transmitted to the operator through the communication module 400. When the operator gets into a vehicle, information about the detected data stored in the memory unit 310 is provided for the operator through a display unit 40 arranged on an instrument panel.

When the operator turns off the power of the terminal 5, or when the data detected by the detection unit 100 is not transmitted due to temporary communication failure, the detected data is temporarily stored in the memory unit 310 and is repeatedly retransmitted through the communication module 400 when the terminal 5 of the operator is normally operated. Therefore, it is possible to prevent a phenomenon in which the operator does not check the current state information of the electric compressor 1 due to not receiving the detected data.

Thus, it is possible to minimize problems caused when the electric compressor 1 is not used for a long time, and the maintenance of the electric compressor can be periodically performed, resulting in an improvement in durability.

The detection unit 100 includes a temperature sensor 110 which detects a temperature in the electric compressor and a pressure sensor 120 which detects a pressure in the electric compressor. Both of the temperature sensor 110 and the pressure sensor 120 may be mounted to an inverter 6 so as to detect the changes of temperature and pressure in the electric compressor and transmit the detected data to the control unit 300. For reference, the phase of refrigerant may be determined using only the temperature sensor or using both of the temperature sensor and the pressure sensor in the present embodiment, similarly to the first embodiment. The installation positions of the temperature sensor and the pressure sensor are not necessarily limited to the inside of the electric compressor.

The electric compressor 1 uses a refrigerant as working fluid therein, and the refrigerant may be changed to a liquid-phase refrigerant at below-freezing temperatures. The temperature sensor 110 detects the current temperature of the refrigerant, and the pressure sensor 120 detects the current pressure of the refrigerant.

Temperature data and pressure data are transmitted to the control unit 300 via the inverter 6. Particularly, the temperature sensor 110 may be mounted to the inverter which is located at a position facing a suction port S of the electric compressor, and may stably detect the temperature of the refrigerant, so that the reliability of the detected temperature data is improved.

For reference, the temperature sensor may be installed at any position except for the above position. For example, the temperature sensor may be installed outside the vehicle for detecting the temperature of outdoor air, may be installed at a position for detecting the temperature around the electric compressor, may be installed in an engine room for detecting the temperature in the engine room, or may be installed at a position for detecting the temperature in the vehicle.

The pressure sensor 120 detects the pressure of the refrigerant introduced through the suction port S, and it is possible to accurately determine whether the refrigerant is currently present in gas phase or in liquid phase through the temperature sensor 110 and the pressure sensor 120.

The connection unit 200 is a three-phase coil wound around a stator 4 located within the electric compressor, and has a Y-connection form as a whole. The connection unit 200 includes a first connection 210, a second connection 220, and a third connection 230, which will be described later. The first connection 210 is wound many times on the outermost side of the stator 4. The second connection 220 is wound many times radially inward from the wound first connection 210. The third connection 230 is wound many times radially inward from the wound second connection 220.

The first, second, and third connections 210, 220, and 230 form a Y-connection about a neutral point 20a, and electromagnetic force is generated when actuating power is applied to the first, second, and third connections 210, 220, and 230 through the inverter 6. When the actuating power is DC power, the power is selectively applied to the first and second connections 210 and 220 corresponding to two phases in the three-phase coil, and thus the first and second connections 210 and 220 generate heat by wire-wound resistance.

The connection unit 200 is disposed at a position closest to the passage 3 for the flow of refrigerant. Since the first and second connections 210 and 220 are disposed at positions closest to the passage, the first and second connections 210 and 220 generate heat by power applied thereto when the refrigerant is present in the liquid phase, thereby enabling the liquid-phase refrigerant to be rapidly changed to a gas-phase refrigerant.

In this case, the liquid-phase refrigerant in the electric compressor 1 is changed to a gas-phase refrigerant, and the temperature sensor 110 and the pressure sensor 120 detect the temperature and pressure of the refrigerant together with the heating of the first and second connections 210 and 220, and transmit the detected data to the control unit 300.

The control unit 300 provides the current state information of the electric compressor 1 according to the data detected by the detection unit 100 for a driver through the display unit 40 arranged on the instrument panel. The display unit 40 displays the current state information of the electric compressor 1 in real time for the driver. Accordingly, it is possible to prevent malfunction of the electric compressor 1 or improve the response of the electric compressor 1. In addition, oil contained in the refrigerant may be stably separated for improving oil separation efficiency, and it is thus possible to improve the lubrication performance of many components included in the electric compressor 1.

Hereinafter, a method of controlling an electric compressor according to a third embodiment of the present invention will be described with reference to the drawings.

Figure 7:
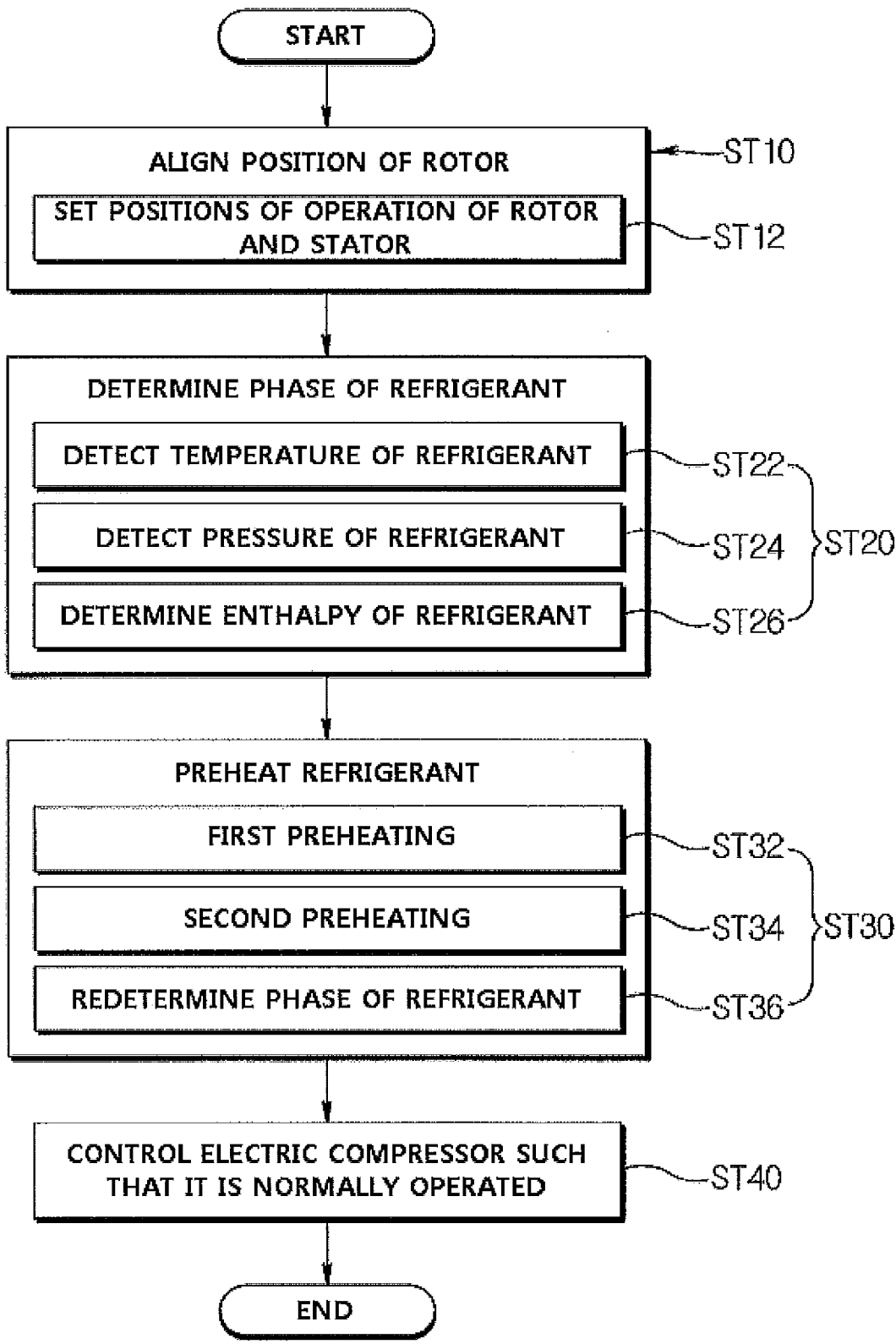
FIG. 7 is a flowchart illustrating a method of controlling an electric compressor according to a third embodiment of the present invention.

Referring to FIG. 7, the method of controlling an electric compressor includes a step (ST10) of aligning the position of a rotor after the power of an electric compressor is turned on, a refrigerant phase determination step (ST20) of determining whether a refrigerant is in liquid phase or in gas phase after the position of the rotor is aligned, a step (ST30) of preheating the refrigerant by applying power to the electric compressor according to the phase of refrigerant, and a step (ST40) of controlling the electric compressor such that it is normally operated after the refrigerant is preheated.

The step (ST10) of aligning the position of a rotor includes a step (ST12) of setting the positions of operation of the rotor and a stator of the electric compressor by applying DC power to the electric compressor for t seconds. When DC power is initially applied to the electric compressor for t seconds in order to set the positions of operation of the rotor and the stator (ST12), the DC power is applied to only first and second connections 21 and 22. As a result, certain polarities (N pole and S pole) are formed, and electromagnetic force is maintained in the state in which a magnet provided in the rotor and the stator have different polarities, so that the electric compressor is prepared for stable operation.

In this state, when AC power is applied to a connection unit, the compression of the refrigerant may be stably maintained while the electric compressor is operated. Therefore, it is possible to accurately set the position of rotation of the rotor by aligning the position of the rotor before the refrigerant is compressed.

After the position of the rotor is aligned (ST10), the refrigerant phase determination step (ST20) is performed to determine whether the refrigerant is in the liquid phase or in the gas phase. To this end, the refrigerant phase determination step (ST20) includes a step (ST22) of detecting a temperature in the electric compressor and a step (ST24) of detecting a pressure in the electric compressor, in order to determine whether the current refrigerant in the electric compressor is in the liquid phase or in the gas phase.

Figure 8:
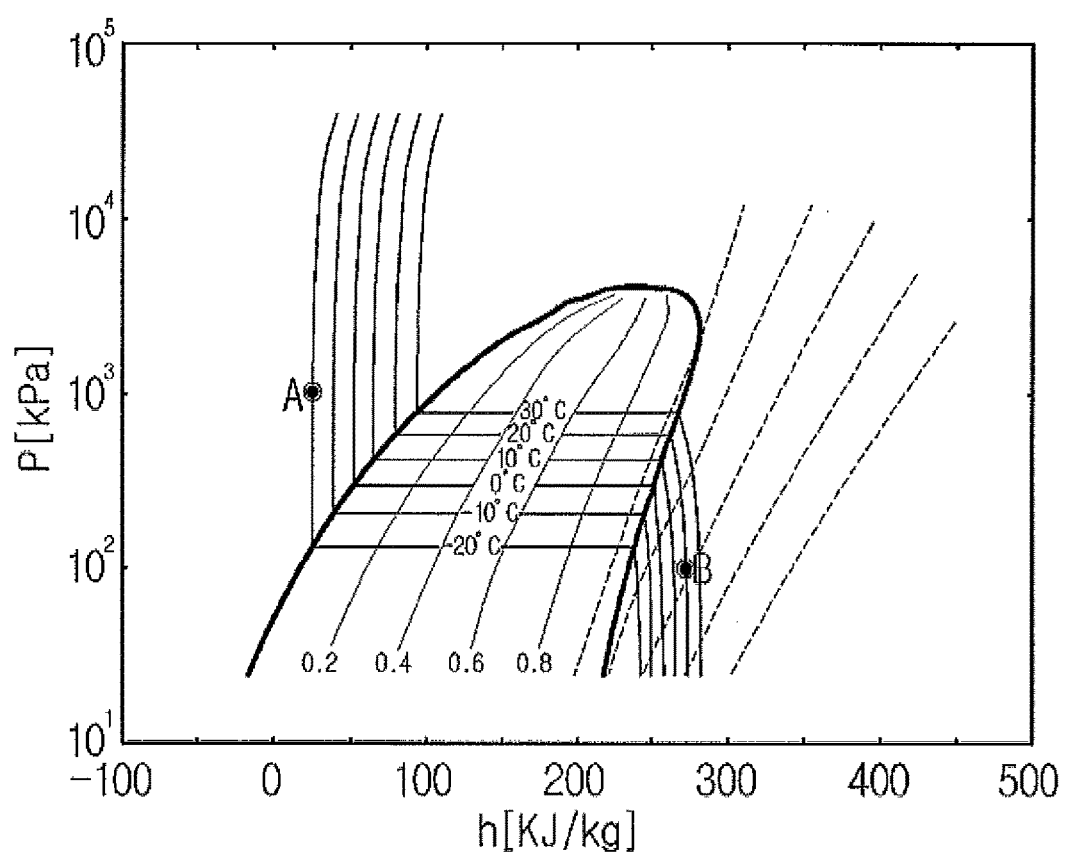
FIG. 8 is a graph illustrating a PH chart according to refrigerants used for an electric compressor according to the third embodiment of the present invention.

Referring to FIG. 8 in which a PH chart is depicted, for example, when R134a refrigerant is used and it is detected that the current temperature in the electric compressor is −20° C. and the current pressure in the electric compressor is 1000 kPa, the refrigerant which is currently present in the electric compressor may be determined to be in a liquid-phase section indicated by "A" of the upper left in FIG. 8. For reference, the refrigerant indicated by "B" refers to a refrigerant which is present in gas phase at temperatures above zero, and the left in the PH chart may be defined as liquid phase and the right in the PH chart may be defined as gas phase.

In order to more accurately determine the current phase of refrigerant in the electric compressor together with the temperature data and pressure data of the refrigerant, an enthalpy determination step (ST26) of numerically calculating enthalpy based on the temperature data and the pressure data is performed so that the current phase of refrigerant in the electric compressor may be determined.

In the enthalpy determination step (ST26), the enthalpy may be numerically calculated by inputting a program for the calculation thereof to the control unit. Therefore, the current phase of refrigerant in the electric compressor may be accurately determined based on the above-mentioned temperature data, pressure data, and enthalpy data.

For example, when it is detected that the temperature in the electric compressor using R134a refrigerant is −20° C. and the pressure in the electric compressor is 1000 kPa, enthalpy corresponding to 25 kJ/kg is numerically calculated and the current phase of refrigerant is accurately determined to be liquid phase. Thus, the phase of refrigerant in the electric compressor may be accurately determined without errors.

In order to preheat the refrigerant (ST30) after the current phase of refrigerant is determined, a first preheating step (ST32) of differently controlling the intensity and application time of the DC power applied to the electric compressor is performed so that the formed liquid-phase refrigerant may be rapidly changed to a gas-phase refrigerant.

Since the intensity of the DC power in the first preheating step (ST32) is relatively greater than that of DC power in a second preheating step (ST34) to be described later, a large amount of liquid-phase refrigerant may be rapidly changed to a gas-phase refrigerant. Therefore, the operator may operate an air conditioning system within a considerable short time by reducing a waiting time for normally operating the electric compressor. Consequently, it is possible to improve satisfaction about the vehicle and prevent malfunction of the electric compressor due to the compression of the liquid-phase refrigerant.

In addition, since the timing and application time of the DC power in the first preheating step (ST32) are relatively longer than those of DC power in the second preheating step (ST34), a large amount of liquid-phase refrigerant may be rapidly changed to a gas-phase refrigerant.

The step (ST30) of preheating the refrigerant further includes a second preheating step (ST34) of uniformly controlling the intensity and application time of the DC power applied to the electric compressor after the first preheating step. When the DC power is applied to the electric compressor in the state in which the intensity of the DC power is increased for a long time, electric power may be unnecessarily consumed. Therefore, although the method of preheating the liquid-phase refrigerant may vary according to the amount of liquid-phase refrigerant, the method preheats a portion of the remaining liquid-phase refrigerant by changing the intensity and time of the DC power for t1 time and by uniformly maintaining the intensity and time of the DC power for t2 time.

Accordingly, the liquid-phase refrigerant formed in the electric compressor is rapidly and stably changed to the gas-phase refrigerant through the change of the intensity and time of the DC power applied to the electric compressor, and the electric compressor may be stably used. As a result, it is possible to improve durability of the electric compressor and oil separation efficiency according to refrigerant compression.

The step (ST30) of preheating the refrigerant further includes a refrigerant phase redetermination step (ST36) of redetermining whether the refrigerant is currently present in liquid phase or in gas phase while the liquid-phase refrigerant is preheated. In step ST36, the temperature and pressure in the electric compressor are repeatedly detected and the enthalpy is recalculated, so that the current phase of refrigerant present in the electric compressor may be accurately determined.

Accordingly, it is possible to accurately change the liquid-phase refrigerant to the gas-phase refrigerant by detecting and calculating changes in temperature, pressure, and enthalpy in the electric compressor, instead of changing the liquid-phase refrigerant to the gas-phase refrigerant by merely applying DC power to the electric compressor for a certain time. Therefore, a waiting time for which the operator operates the air conditioning system is reduced.

Hereinafter, a method of controlling an electric compressor according to a fourth embodiment of the present invention will be described with reference to the drawings.

Figure 9:
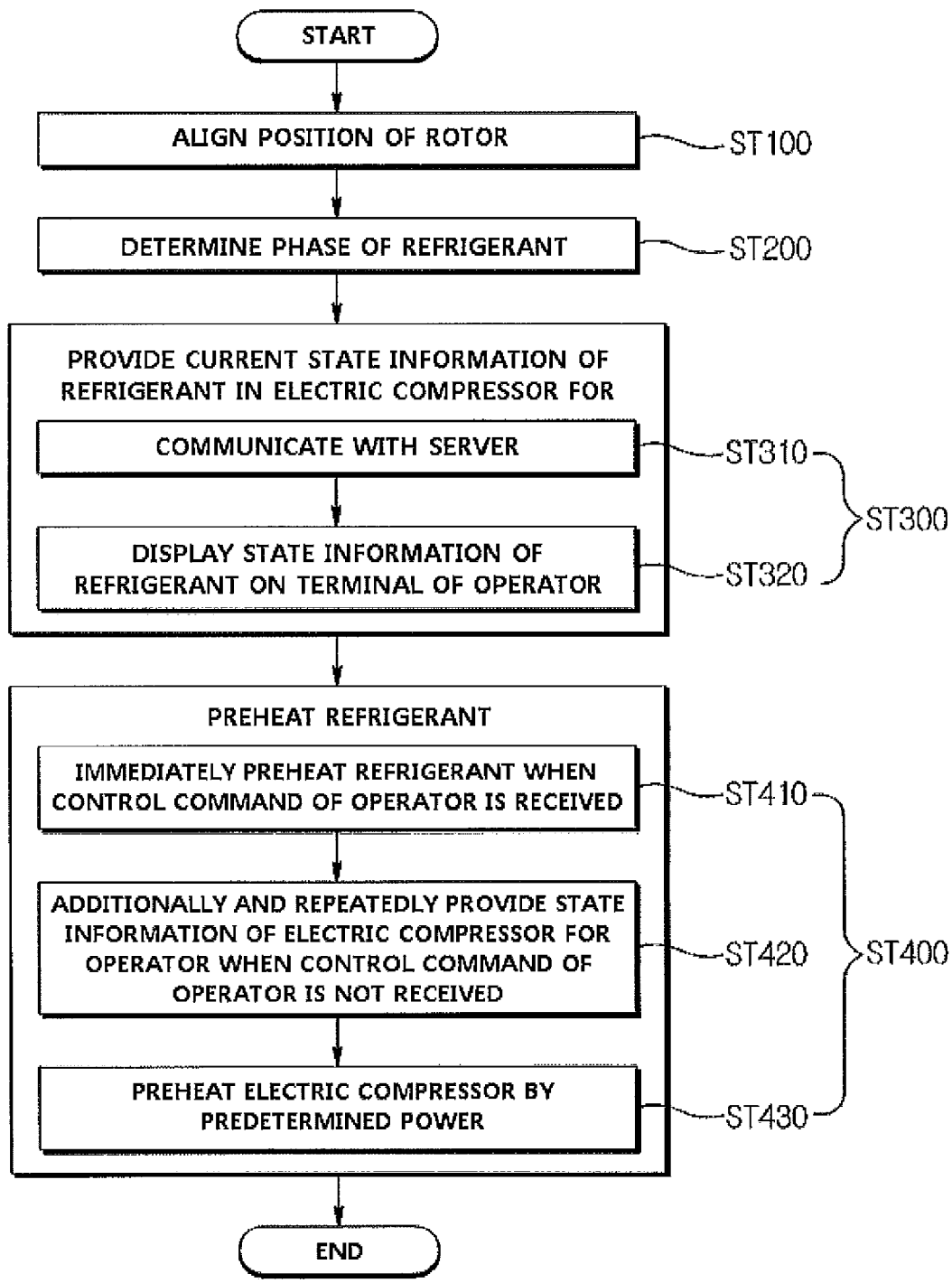
FIG. 9 is a flowchart illustrating a method of controlling an electric compressor according to a fourth embodiment of the present invention.

Referring to FIG. 9, the method of controlling an electric compressor according to the present embodiment differs from the above-mentioned embodiment in that the liquid-phase refrigerant remaining in an electric compressor is changed to a gas-phase refrigerant through communication with an operator in real time.

To this end, the method includes a step (ST100) of aligning the position of a rotor after the power of an electric compressor is turned on, a refrigerant phase determination step (ST200) of determining whether a refrigerant is in liquid phase or in gas phase after the position of the rotor is aligned, an information provision step (ST300) of providing the current state information of the electric compressor for an operator according to the phase of refrigerant in the electric compressor, a step (ST400) of preheating the refrigerant by applying power to the electric compressor according to whether or not the control command of the operator is present, and a step (ST500) of controlling the electric compressor such that it is normally operated after the refrigerant is preheated.

Since the step (ST100) of aligning the position of a rotor and the refrigerant phase determination step (ST200) of determining whether a refrigerant is in liquid phase or in gas phase after the position of the rotor is aligned are similar to those of the above-mentioned embodiment, detailed description thereof will be omitted.

The information provision step (ST300) includes a step (ST310) of communicating with a server through a communication module provided in a mounting objet equipped with the electric compressor, and a step (ST320) of displaying the state information of the refrigerant in the electric compressor on the terminal of the operator.

In the embodiment, when the liquid-phase refrigerant is determined to be currently formed in the electric compressor, this information is provided for the operator so that the operator may accurately determine the state of the electric compressor even in a remote place. Accordingly, the maintenance of the electric compressor may be periodically performed.

Data may be transmitted and received between the smart phone of the operator and the communication module provided in the mounting objet equipped with the electric compressor, and data may be transmitted and received in the state in which an application for checking the state information of the electric compressor is installed in the smart phone of the operator.

The state information of the refrigerant may be transmitted to the smart phone as different types of data. The above state information of the refrigerant, numerical information about temperature, pressure, and enthalpy, and the weekly, monthly, and yearly state information of the electric compressor may be synthetically displayed on the smart phone. In addition, the current state information of the electric compressor may be displayed on the smart phone as icons.

The state information of the electric compressor in the information provision step (ST300) may be interlocked with the smart phone of the operator, or may be displayed around an instrument panel arranged in the driver seat of the vehicle so as to be visually recognized. In this case, the operator may visually and accurately recognize the current state of the electric compressor and perform the maintenance and management of the electric compressor in the state in which the operator gets into the vehicle. Therefore, the durability, safety, and efficiency of the electric compressor are improved.

The step (ST400) of preheating the refrigerant includes a step (ST410) of immediately preheating the refrigerant by applying DC power to the electric compressor when the operator transmits a control command thereto, and a state information repetition warning step (ST420) of additionally providing the state information of the electric compressor for the operator while repeatedly warning the operator of the state information for N times when the operator does not transmit a control command thereto.

When the operator transmits a command for preheating the refrigerant to the electric compressor, the liquid-phase refrigerant is preheated by applying DC power to first and second connections of a connection unit. In this case, the liquid-phase refrigerant is preheated only when the operator transmits the control command to the electric compressor through the communication module, and the operator repeatedly receives whether or not to perform preheating when the control command is not transmitted to the electric compressor for a certain time.

If the operator does not transmit the control command to the electric compressor even after the state information repetition warning step (ST420), a step (ST430) of automatically controlling the electric compressor by predetermined power is performed. This corresponds to a case where the operator may not immediately check the smart phone or a case where the operator is at another business. In this case, the liquid-phase refrigerant is automatically preheated by applying DC power to the connection unit through the inverter for t seconds.

Accordingly, the maintenance of the electric compressor may be automatically performed even though the operator does not transmit the command for preheating to the electric compressor. Consequently, it is possible to prevent the liquid-phase refrigerant from being compressed and improve the fatigue durability and lubrication performance of the electric compressor.

Hereinafter, a method of controlling an electric compressor according to a fifth embodiment of the present invention will be described with reference to the drawings. The present embodiment differs from the above embodiments in that the liquid-phase refrigerant formed in an electric compressor is automatically changed to a gas-phase refrigerant without the command of an operator in the state in which a vehicle is stopped.

Figure 10:
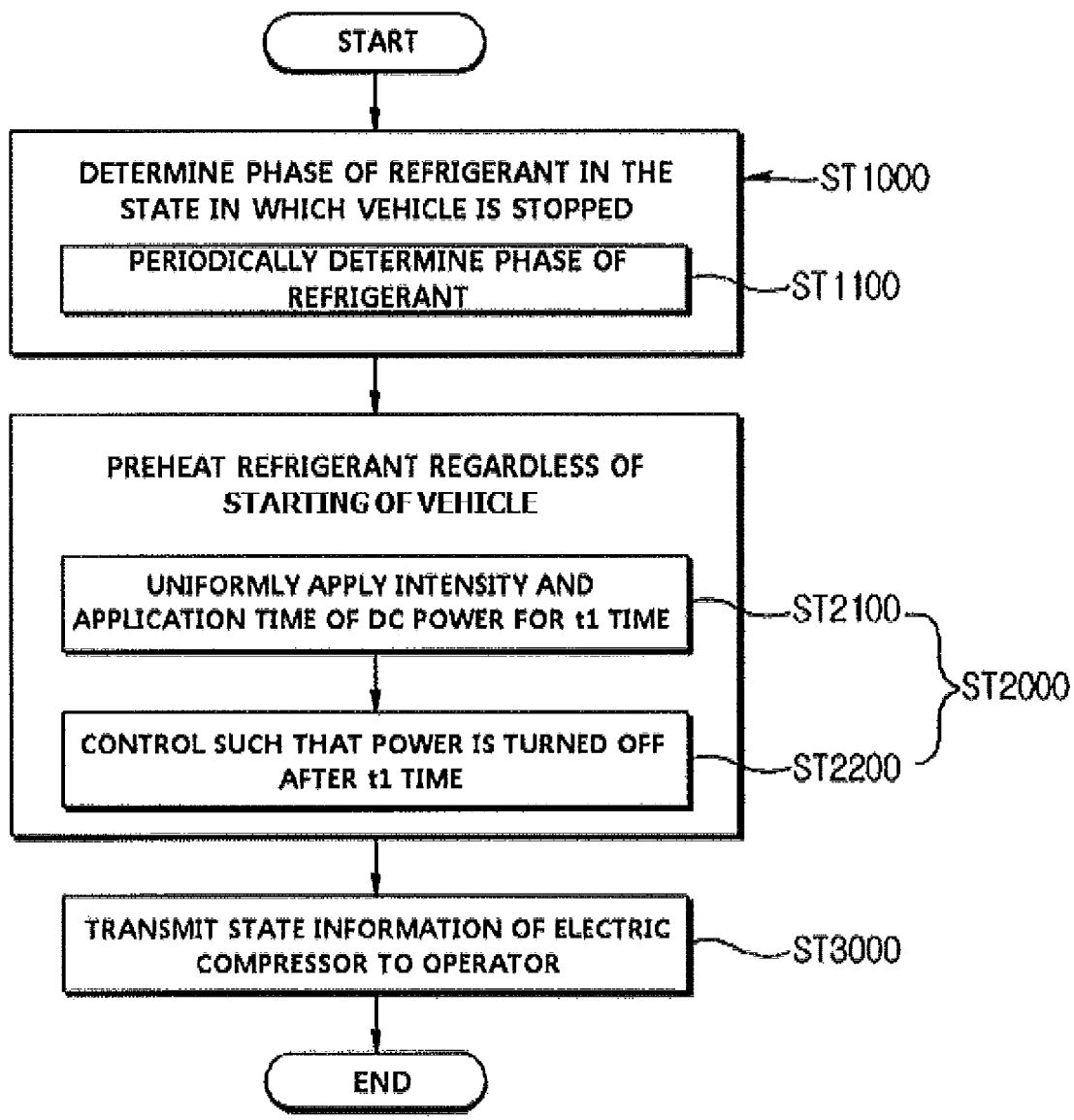
FIG. 10 is a flowchart illustrating a method of controlling an electric compressor according to a fifth embodiment of the present invention.
Figure 11:
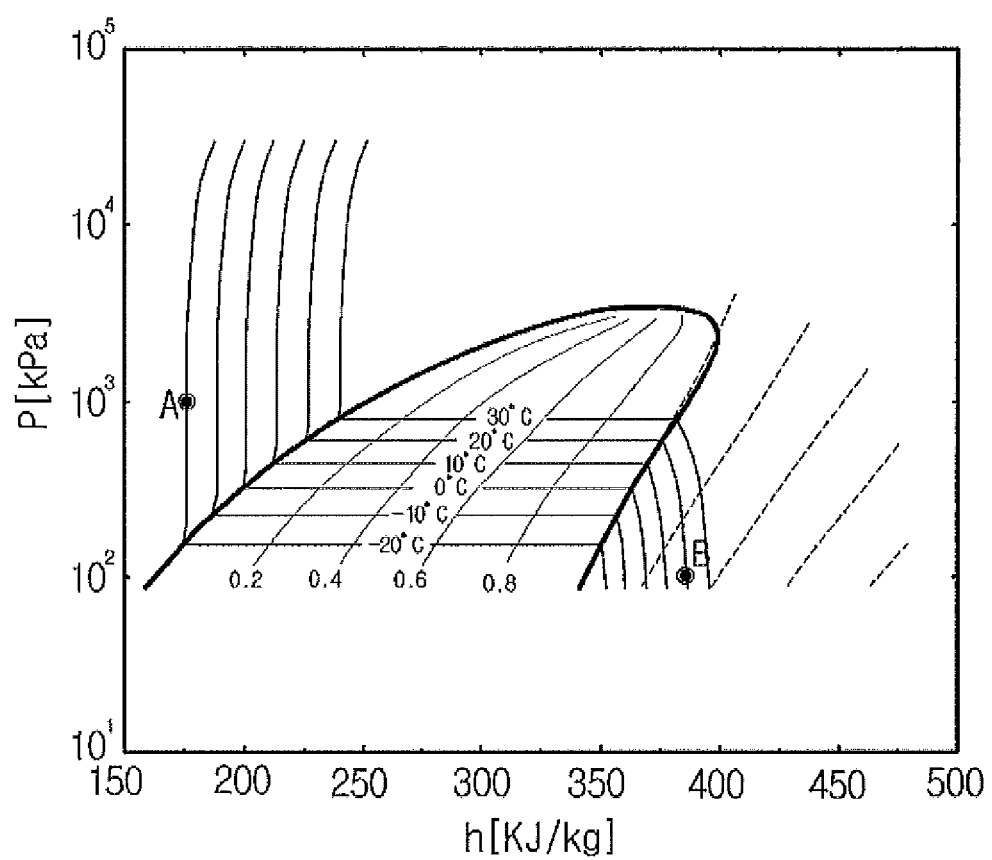
FIG. 11 is a graph illustrating a PH chart according to refrigerants used for an electric compressor according to the fifth embodiment of the present invention.

Referring to FIGS. 10 and 11, the method includes a refrigerant phase determination step (ST1000) of determining whether a refrigerant in an electric compressor is in liquid phase or in gas phase in the state in which a vehicle is stopped, a step (ST2000) of preheating the refrigerant by applying power to the electric compressor according to the phase of refrigerant regardless of the starting of the vehicle, and a step (ST3000) of transmitting the current state information of the electric compressor to an operator after the refrigerant is preheated.

The refrigerant phase determination step (ST1000) includes a step (ST1100) of periodically determining the phase of refrigerant. When the refrigerant is exposed to low temperature for a long time, it is changed from gas phase to liquid phase and it is difficult to compress the refrigerant. In the embodiment, the method periodically determines whether the refrigerant is maintained in gas phase or is changed to liquid phase.

To this end, the current phase of refrigerant may be accurately determined by numerically calculating the temperature and pressure of the refrigerant in the electric compressor and the current enthalpy of the refrigerant according to the above temperature and pressure.

For example, when R1234yf refrigerant is used in the electric compressor and it is detected that the current temperature in the electric compressor is −20° C. and the current pressure in the electric compressor is 1000 kPa, the refrigerant which is currently present in the electric compressor may be determined to be in a liquid-phase section indicated by "A" of the upper left in FIG. 11.

In order to more accurately determine the current phase of refrigerant in the electric compressor together with the temperature data and pressure data of the refrigerant, enthalpy is numerically calculated based on the temperature data and the pressure data so that the current phase of refrigerant in the electric compressor may be determined.

The enthalpy may be numerically calculated by inputting a program for the calculation thereof to the control unit. Therefore, the current phase of refrigerant in the electric compressor may be accurately determined based on the above-mentioned temperature data, pressure data, and enthalpy data.

Referring to FIG. 11, for example, when it is detected that the temperature in the electric compressor using R1234yf refrigerant is −20° C. and the pressure in the electric compressor is 1000 kPa, enthalpy corresponding to 176 kJ/kg is numerically calculated and the current phase of refrigerant is accurately determined to be liquid phase. Thus, the phase of refrigerant in the electric compressor may be accurately determined without errors.

The step (ST2000) of preheating the refrigerant includes a step (ST2100) of uniformly applying the intensity and application time of DC power applied to the electric compressor for t1 time, and a step (ST2200) of controlling the electric compressor such that the power applied to the electric compressor is turned off after the power is applied to the electric compressor for t1 time. The intensity of the DC power and the t1 time are optimally set according to temperatures.

In particular, since DC power is applied to the connection unit of the electric compressor regardless of the starting of the vehicle in the embodiment, the liquid-phase refrigerant is changed to the gas-phase refrigerant when the DC power is applied to the electric compressor for t1 time through a relay (not shown).

The power applied to the connection unit of the electric compressor is turned off after the preheating of the liquid-phase refrigerant is completed, and the state in which the current refrigerant in the electric compressor is changed to the gas-phase refrigerant is transmitted to the operator (ST3000).

Thus, it is possible to prevent operation efficiency and oil separation efficiency from deteriorating due to the liquid-phase refrigerant even though the vehicle is stopped, and to maintain the state of the electric compressor.

As is apparent from the above description, in accordance with an electric compressor and a method of controlling the same, it is possible to accurately determine a phase of refrigerant in the electric compressor and to change the refrigerant to a gas-phase refrigerant through preheating thereof according to the determined result. Through such a method, it is possible to stably prevent problems and errors due to liquid compression.

In addition, an operator can remotely check the phase of refrigerant in the electric compressor, or can easily perform the maintenance of the electric compressor regardless of ON/OFF of a mounting object equipped with the electric compressor. Therefore, it is possible to improve the durability and operation efficiency of the electric compressor and to simultaneously improve the oil separation efficiency of the electric compressor.

An electric compressor and a method of controlling the same according to embodiments of the present invention may be applicable to vehicles equipped with compressors for compressing refrigerant or industrial compressors each using refrigerant as working fluid.

While the present invention has been described with respect to the specific embodiments, it will be apparent to those skilled in the art that various changes and modifications may be made without departing from the spirit and scope of the invention as defined in the following claims.

What is claimed is:

1. An electric compressor comprising:
   a detection unit detecting a phase of a refrigerant in the electric compressor;
   a connection unit wound at a position adjacent a passage of a housing of the electric compressor, the passage conveying the refrigerant in the electric compressor, wherein the connection unit is a three-phase coil wound around a stator disposed in the electric compressor, the connection unit further comprising:
      a first connection wound multiple times on an outermost side of the stator located within the electric compressor;
      a second connection wound multiple times radially inward from the first connection; and
      a third connection wound multiple times radially inward from the second connection, wherein the first connection and the second connection are disposed closer to the passage than the third connection; and
   a control unit controlling the connection unit according to the phase of the refrigerant by controlling a power applied to the connection unit in response to data received by the detection unit, wherein the control unit causes the power applied to the connection unit to be applied only to the first connection and the second connection when the electric compressor is initially driven,
   wherein a portion of the refrigerant disposed in the passage is in a liquid phase, wherein the portion of the refrigerant is heated by the first connection and the second connection to evaporate the portion of the refrigerant prior to compression of the portion of the refrigerant within the electric compressor.

2. The electric compressor according to claim 1, the detection unit further comprising a temperature sensor detecting a temperature in the electric compressor.

3. The electric compressor according to claim 1, the detection unit further comprising a pressure sensor detecting a pressure in the electric compressor.

4. The electric compressor according to claim 1, wherein the control unit provides current state information of the electric compressor according to the data received by the detection unit for an operator through a display unit.

5. The electric compressor according to claim 1, the control unit further comprising a calculation unit calculating enthalpy data according to the data received by the detection unit.

6. An electric compressor comprising:
   a detection unit detecting a phase of a refrigerant in the electric compressor;
   a connection unit wound adjacent a passage of a housing of the electric compressor, the passage conveying the refrigerant in the electric compressor, wherein the connection unit is a three-phase coil wound around a stator disposed in the electric compressor, the connection unit further comprising:
      a first connection wound multiple times on an outermost side of the stator located within the electric compressor;
      a second connection wound multiple times radially inward from the first connection; and
      a third connection wound multiple times radially inward from the second connection, wherein the first connection and the second connection are disposed closer to the passage than the third connection;
   a control unit controlling a power applied to the connection unit in response to data received by the detection unit, wherein the control unit causes the power applied to the connection unit to be applied only to the first connection and the second connection when the electric compressor is initially driven, wherein a portion of the refrigerant disposed in the passage is in a liquid phase, wherein the portion of the refrigerant is heated by the first connection and the second connection to evaporate the portion of the refrigerant prior to compression of the portion of the refrigerant within the electric compressor, and
   a communication module transmitting a control signal from the control unit to a terminal of an operator for providing current state information of the electric compressor.

7. The electric compressor according to claim 6, the control unit further comprising a memory unit storing the data received by the detection unit if the detected data is not transmitted to the operator through the communication module.

* * * * *